United States Patent
Ohgoshi et al.

(10) Patent No.: US 6,721,296 B2
(45) Date of Patent: *Apr. 13, 2004

(54) CODE DIVISION MULTIPLE ACCESS MOBILE COMMUNICATION SYSTEM

(75) Inventors: Yasuo Ohgoshi, Kanagawa-Ken (JP); Takashi Yano, Tokorozawa (JP); Nobukazu Doi, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/217,404

(22) Filed: Aug. 14, 2002

(65) Prior Publication Data

US 2002/0196768 A1 Dec. 26, 2002

Related U.S. Application Data

(63) Continuation of application No. 09/922,803, filed on Aug. 7, 2002, now Pat. No. 6,456,609, which is a continuation of application No. 09/299,101, filed on Apr. 26, 1999, now Pat. No. 6,292,477, which is a continuation of application No. 08/709,734, filed on Sep. 9, 1996, now Pat. No. 5,943,329.

(30) Foreign Application Priority Data

Sep. 11, 1995  (JP) ............................................. 7-232227

(51) Int. Cl.[7] .............................................. H04B 7/216
(52) U.S. Cl. ...................................... 370/335; 370/362
(58) Field of Search ............................... 370/335, 320, 370/342, 491, 206, 503, 479, 350, 468; 375/200, 206, 362, 344, 130

(56) References Cited

U.S. PATENT DOCUMENTS

| | | | |
|---|---|---|---|
| 4,485,477 A | 11/1984 | Nossen | 375/200 |
| 4,621,365 A | 11/1986 | Chiu | |
| 4,856,027 A | 8/1989 | Nakamura et al. | 375/344 |
| 4,901,307 A | 2/1990 | Gilhousen et al. | |
| 5,062,122 A | * 10/1991 | Pham et al. | |

(List continued on next page.)

OTHER PUBLICATIONS

M.K. Sust, et al, "Code and Frequency Acquisition for Fully Digital CDMA–VSATS", Countdown to the New Millennium, Phoenix, Dec. 2–5, 1991, Proceedings of the Global Telecommunications Conference, IEEE, US, vol. 3, Dec. 2, 1991, pp. 498–504.

(List continued on next page.)

Primary Examiner—Kenneth Vanderpuye
(74) Attorney, Agent, or Firm—Antonelli, Terry, Stout & Kraus, LLP

(57) ABSTRACT

A code division multiple access (CDMA) mobile communication system with improvements to permit stable reception with a minimum of bit error. The system comprises a voltage-controlled oscillator for supplying a carrier to a radio frequency quadrature demodulator, and a frequency controller for detecting a frequency error from a phase correction signal of the first step to generate a control signal that controls the oscillator. The frequency controller includes an extracting circuit and an integrating circuit. The extracting circuit extracts a phase change based on the frequency error derived from the phase correction signal of the first step and from a signal preceding that signal by a predetermined delay time. The integrating circuit integrates the phase change and outputs the integrated result as the control signal. The predetermined delay time is preferably set within a range not exceeding the delay time needed for averaging by an averaging circuit that receives the phase correction signal of the first step and outputs a phase correction signal. The carrier to a radio frequency quadrature modulator is preferably supplied from the voltage-controlled oscillator.

12 Claims, 12 Drawing Sheets

U.S. PATENT DOCUMENTS

| | | | |
|---|---|---|---|
| 5,081,652 A | | 1/1992 | Farahati et al. .............. 375/344 |
| 5,301,206 A | | 4/1994 | Ishigaki et al. .............. 375/200 |
| 5,361,276 A | | 11/1994 | Subramanian .............. 375/200 |
| 5,548,811 A | * | 8/1996 | Kumagai et al. ......... 455/192.2 |
| 5,559,828 A | | 9/1996 | Armstrong et al. .......... 375/200 |
| 5,581,582 A | | 12/1996 | Choi .......................... 375/344 |
| 5,584,068 A | | 12/1996 | Mohindra ................. 455/192.2 |
| 5,623,486 A | * | 4/1997 | Dohi et al. .................. 370/342 |
| 5,644,590 A | | 7/1997 | Sugita ........................ 375/130 |
| 5,666,352 A | | 9/1997 | Ohgoshi et al. ............. 375/200 |
| 5,796,772 A | | 8/1998 | Smith et al. ................. 375/130 |
| 6,028,852 A | | 2/2000 | Miya et al. .................. 370/335 |
| 6,104,748 A | * | 8/2000 | Kaku .......................... 375/200 |
| 6,137,825 A | | 10/2000 | Sekine et al. ................ 375/130 |
| 6,205,127 B1 | | 3/2001 | Ramesh ...................... 370/329 |
| 6,233,271 B1 | | 5/2001 | Jones et al. .................. 375/142 |
| 6,263,010 B1 | | 7/2001 | Naruse et al. ............... 375/130 |

OTHER PUBLICATIONS

"Coherent Detection for CDMA Mobile Communication Systems" By: Yasduo Ohgoshi, et al., Source–Electronic Information Communication Convention, Fall of 1994.

* cited by examiner

CODE DIVISION MULTIPLE ACCESS MOBILE COMMUNICATION SYSTEM

This is a continuation of application Ser. No. 09/922,803 filed Aug. 7, 2002 now U.S. Pat. No. 6,456,609 which is a continuation of application Ser. No.: 09/299,101, filed Apr. 26, 1999 now U.S. Pat. No. 6,292,477, which is a continuation of application Ser. No.: 08/709,734 filed Sep. 9, 1996 now U.S. Pat. No. 5,943,329.

BACKGROUND OF THE INVENTION

The present invention relates to a mobile communication system operating on what is known as the code division multiple access (CDMA) system.

The CDMA system involves multiplexing a plurality of communication channels using spread spectrum codes, each channel being assigned a different spread spectrum code. A given signal to be transmitted is multiplied (i.e., spread) by the spread code assigned to the own channel, and is multiplexed with other similarly spread signals on different channels before being transmitted. At a receiver, the multiplexed signals are multiplied (i.e., despread) by the same spread code so that only the target signal will be extracted correlated on the own channel. The signals on the other channels are perceived merely as noise because these signals with their different spread codes remain uncorrelated. The level of the noise may be sufficiently lowered so as not to disturb the signal reception. The CDMA system is attracting attention as a system fit for drastically improving the efficiency of frequency utilization and has been commercialized in some areas.

Where CDMA communication is implemented using spread codes, some kind of signal modulation (e.g., quadrature phase shift keying or QPSK) precedes the spreading of the signal for transmission. At a receiving point, the despreading of the signal is followed by demodulation. Despreading and demodulation both represent the detection process whereby the transmitted signal is reconstructed. Commonly used detection methods include a coherent detection method based on the PLL (phase locked loop) circuit and a differential detection method. There also exists a recently proposed coherent detection method that utilizes pilot signals.

Where the CDMA system is applied to a mobile communication system adopting the conventional coherent detection method, the bit error rate of data in a mobile station deteriorates if a fading occurs while the station is moving. In a CDMA mobile communication system utilizing the differential detection method, the bit error rate of data in a mobile station can worsen due to the noise on the air transmission channel even if the station is stationary. The pilot signal-based coherent detection method has been proposed for a system to minimize the deterioration of the bit error rate whether the mobile station is in motion or at rest. The method was discussed at the Autumn 1994 Symposium of the Institute of Electronics, Information and Communication Engineers of Japan as disclosed in the IEICE collection of papers B-5 on radio communication systems A and B, p. 306, "Coherent detection for CDMA Mobile Communication Systems" by Yasuo Ohgoshi et al.

Described below is a conventional mobile communication system that uses pilot signals with reference to the above-cited paper supplemented by some details. The description will first center on the down link of the system (i.e., a link from the base station to a mobile station). FIG. 13 shows a modulation circuit 51 of a base station 1 that transmits data and a first half 52 of the detection circuit of a mobile station 2. The base station 1 actually transmits signals to a plurality of mobile stations 2, and FIG. 13 shows one station as the representative example.

In the modulation circuit 51 (left-hand half of FIG. 13), data first undergoes QPSK modulation, not shown, to divide into an in-phase signal I and a quadrature signal Q. The signals I and Q are spread (i.e., multiplied) respectively by spread code signals $PN_{-ID}$ and $PN_{-QD}$. The two spread code signals are supplied from a spread code generator 91. The rates of the spread code signals $PN_{-ID}$ and $PN_{-QD}$ (called the chip rates) are used to multiply by k (k: spreading ratio) the pre-spread rates (called the symbol rates) of the signals I and Q so that the latter will attain the chip rates. The signals thus spread pass through a radio frequency quadrature modulator 54 to become mutually perpendicular signals that are transmitted on a radio frequency band from an antenna. A temperature compensated crystal oscillator 61 is provided to furnish the modulator 54 with a carrier $C_B$.

The pilot signals will now be described. The transmission circuit is substantially the same as the left-hand half of FIG. 13 and is omitted. An in-phase signal $I_P$, and a quadrature signal $Q_P$ of the pilot signals are spread respectively by spread code signals $PN_{-IP}$ and $PN_{-QP}$. Both spread code signals have the same chip rate as in the case of data. The pilot signals thus spread are subject to radio frequency quadrature modulation by the same carrier $C_B$ as with data, turning into mutually perpendicular signals transmitted on the same radio frequency band as with data. The pilot signals serve as reference signals for demodulation and are common to all channels utilized.

In the first half 52 (right-hand half of FIG. 13) of the detection circuit of the mobile station 2, the received signals from the antenna (data and the pilot signals) pass through a radio frequency quadrature demodulator 57 to reach a low-pass filter 56. The low-pass filter 56 removes the radio frequency components from the signals to yield signals $S_I$ and $S_Q$. A crystal oscillator 60 supplies the demodulator 57 with a carrier $C_M$. The signals $S_I$ and $S_Q$ are composed of the spread signals I and Q (those destined to the own channel as well as to other channels) and of the spread pilot signals $I_P$ and $Q_P$. As such, the signals $S_I$ and $S_Q$ include a phase error caused by fading and a frequency error attributable to the precision of the oscillator 60.

The errors included in the signals $S_I$ and $S_Q$ produce a phase difference therein. When the mutually perpendicular pilot signals are plotted in orthogonal coordinates, the received pilot signals are rotated exactly by the phase shift, as shown in FIG. 14. If the phase shift is represented by $\phi$ and the orthogonal coordinates after quadrature demodulation are designated by $X_1$ and $Y_1$, then the coordinate axes X and Y of the received signals are rotated by $\phi$ displacing the pilot signals. Consequently, the undisplaced signals i and q that should have resulted with no phase shift become $i_1$ and $q_1$ respectively. Such changes are caused by the mixing of one of the two mutually perpendicular signals into the other signal. The phenomenon is expressed by the following formulas:

$$i_1 = i \cos \phi - q \sin \phi$$

$$q_1 = q \cos \phi + i \sin \phi$$

The pilot signals are signals that stay constant following the despreading. Generally, i=1 and q=1. The signal changes into $i_1$, and $q_1$, permit acquisition of a signal CS with the value $\cos \phi$ and a signal SN with the value $\sin \phi$. With the two signals known, it is possible to correct the phase rotation of the data. Since the data includes the same phase shift, the despread data signals are inversely rotated by φ using the signals CS and SN whereby the initial signals I and Q are correctly reconstructed. Thus the signals CS and SN serve as phase correction signals.

The signals $S_I$ and $S_Q$ output by the first half 52 of the detection circuit are subject to despreading and phase correction by the second half of the detection circuit shown in FIG. 15. A pilot signal despreading unit 21 in the upper left portion of FIG. 15 despreads the signals $S_I$ and $S_Q$ by use of the spread code signals $PN_{\_IP}$ and $PN_{\_QP}$ from a spread code generator 25, whereby the pilot signals are extracted. The extracted pilot signals are then added and subtracted mutually, becoming a signal $CS_C$ with a chip rate of cos φ and a signal $SN_C$ with a chip rate of sin φ. The two signals are converted to the symbol rates by an accumulator 41 and thereby turn into phase correction signals $CS_S$ and $SN_S$ of the preliminary stage. The phase correction signals are averaged by an averaging circuit 43 for noise reduction. The averaging provides the phase correction signals CS and SN of the final stage.

FIG. 16 shows a typical circuit constitution of the averaging circuit 43. Reference numerals 430 through 433 are delay gates (Ds) for delaying a signal by a one-symbol period each. In this example, three consecutive symbol values are averaged when added up by adders 235 and 236. It is through this noise reduction arrangement that the phase correction signals CS and SN are obtained. The delay time (average delay time) T required for the averaging by the averaging circuit 43 is given as $$T = Ds \times (N-1)/2$$

where N denotes the number of symbols used for the averaging operation.

The data signals $S_I$ and $S_Q$ are both despreads by an inverse data spreading unit 42 (bottom left in FIG. 15) using the spread code signal $PN_{\_ID}$ for the signal I and the spread code signal $PN_{\_QD}$ for the signal Q. The operation causes four signals to be extracted. The four chip rate signals are converted by an accumulator 44 into symbol rates to become signals $D_1$ through $D_4$. After this, the signals $D_1$ through $D_4$ are each delayed by a data delaying unit 48 (FIG. 17) by the average delay time T of the averaging circuit 43. The operation yields signals $D_{10}$ through $D_{40}$. Where the data delaying unit 48 is constituted by a number of delay gates (Ds) in stages of cascade connection each gate providing one-symbol period delay, the gate count M per stage is given as $$M = (N-1)/2$$

In the above example, N=3 and thus M=1, so that the delay gates 480 through 483 of the data delaying unit 48 are each composed of a one-symbol delay gate (Ds).

The signals $D_{10}$ through $D_{40}$ are fed to a phase correction circuit 49 in which the signals are corrected in phase rotation by use of the correction signals CS and SN. A typical constitution of the phase correction circuit 49 is shown in FIG. 18. The phase correction circuit 49 performs phase correction as follows: the signals $D_{10}$ and $D_{40}$ are multiplied by the correction signal CS, and the signals $D_{20}$ and $D_{30}$ by the correction signal SN. The multiplied results are added and subtracted mutually so as to rotate the orthogonal axes of the received data by −φ in phase (i.e., the phase shift φ is reduced to zero in FIG. 14). The phase correction provides reconstructed signals $I_R$ and $Q_R$ of the original signals I and Q. The signals $I_R$ and $Q_R$ then undergo QPSK demodulation, not shown, to become the original data.

One disadvantage of the conventional detection circuit above is that the restored signals $I_R$ and $Q_R$ are unavoidably affected by the frequency precision of the crystal oscillator 60 (right-hand side in FIG. 13). A transmitter 60 used in the mobile station necessarily includes a certain practical frequency error because the mobile station is for use by general users. That is, on the one hand, if the frequency error involved in the data is large enough to cause apparent phase irregularities over the average delay time T during data demodulation, no precise correction signals can be acquired and the bit error rate of the detected data worsens. On the other hand, if the average delay time T is shortened to avert the deterioration of the bit error rate, the adverse effects of the frequency error are diminished but the line noise becomes more pronounced.

On the up link (i.e., a link from the mobile station to the base station), the carrier $C_M$ from the crystal oscillator 60 often doubles as a carrier for use in radio frequency quadrature modulation by the modulation circuit of the mobile station. In that case, the signals transmitted by the mobile station and received by the base station include both the phase error caused by fading and the frequency error originating from the crystal oscillator. The frequency error results in the inevitable deterioration of the bit error rate in the detection process of the base station.

The deficiencies above are conventionally circumvented, particularly where data of lower bit rates than normal are transmitted, by the method of burst data transmission with no change in the spreading ratio, as stipulated by the U.S. digital radio communication standard IS (Interim Standard)-95. Under the system, transmitting data at 1/r of the standard bit rate compresses the data to 1/r in temporal terms. The time-compressed data is transmitted in bursts at fixed intervals.

How the burst signals are sent intermittently is illustrated in FIG. 19. In FIG. 19, the axis of abscissa represents time and the axis of ordinate denotes transmission power. Reference numeral 140 is a radio signal waveform of standard bit rate data. Reference numerals 141, 142 and 143 stand respectively for radio signal waveforms of data at ½, ¼ and ⅛ of the standard bit rate. The number of burst signals varies with the bit rate. All burst signals have the same standard bit rate when temporally compressed as described. It follows that every burst signal has the same symbol rate and thus the spreading ratio remains unchanged.

The arrangements above are necessitated by the following reasons: if compression is not carried out, the one-symbol period gets longer the lower the data rate. Meanwhile, the number of symbols N for use by the averaging circuit 43 (FIG. 15) in the demodulation circuit remains substantially the same regardless of the bit rate in view of noise reduction. Thus the average delay time T becomes longer the lower the data rate. A prolonged delay time T prompts the frequency error to deteriorate the bit error rate as discussed above. The lower the bit rate, the more deteriorated the bit error rate. To avoid this deficiency requires keeping the symbol rate constant. The requirement necessitates the use of complicated circuits in the mobile station, which runs counter to the inherent need for the mobile station to simplify its circuitry.

SUMMARY OF THE INVENTION

It is therefore an object of the present invention to overcome the above and other deficiencies and disadvantage of the prior art and to provide an improved CDMA mobile communication system permitting stable signal reception with a minimum of bit error.

In carrying out the invention and according to one aspect thereof, there is provided a CDMA mobile communication system including a mobile station comprising a voltage-controlled oscillator and a frequency controller. The voltage-controlled oscillator acts as a circuit to supply a carrier to a radio frequency quadrature demodulator. The frequency controller detects a frequency error from a phase correction signal of the first step and uses the detected frequency error as the basis for generating a control signal for use by the oscillator. The frequency controller may illustratively be composed of two circuits: a circuit for detecting a phase change caused by the frequency error derived from the phase correction signal of the first step and from a signal preceding the correction signal by a predetermined delay time; and an integrating circuit for integrating the phase change and outputting the result as the above control signal.

The voltage-controlled oscillator and the frequency controller operate to establish within the detection circuit of the mobile station a control loop whereby the phase change is reduced substantially to zero. This minimizes the frequency error. Because the frequency of the oscillator is kept as precise as that of the oscillator of the base station, the phase shift attributable to the frequency error is significantly reduced. This provides a detection circuit that works stably with a minimum of bit error.

The predetermined delay time may preferably be set within a range not exceeding the delay time needed for the averaging operation by the averaging circuit which admits the phase correction signal of the first step and outputs a phase correction signal.

The carrier to a radio frequency quadrature modulator may preferably be supplied by the voltage-controlled oscillator. Because the frequency of the radio signal sent to the base station is kept accurate, the base station is allowed to implement pilot signal-based coherent detection stably with a minimum of bit error. Where the mobile station transmits data at a low bit rate, the system allows the terminal to keep the chip rate of the spread code constant and to transmit data with varying spreading ratios but without time compression. Such data transmission is readily implemented by changing the circuit constant in keeping with the symbol rate of the data, with no change in the circuit constitution.

These and other objects and many of the attendant advantages of the invention will be readily appreciated as the same becomes better understood by reference to the following detailed description when considered in connection with the accompanying drawings.

DETAILED DESCRIPTION OF THE PREFERRED EMBODIMENTS

Figure 1:
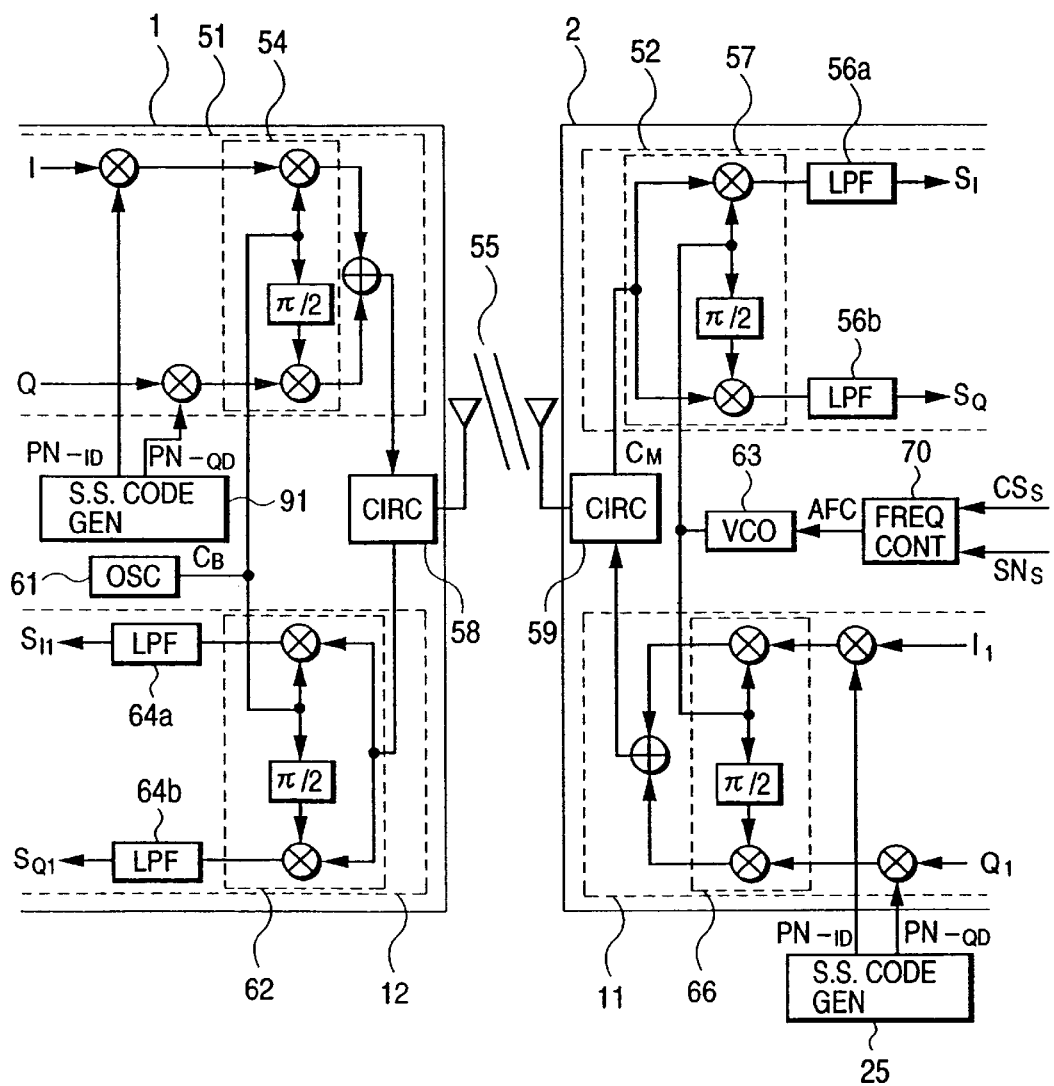
FIG. 1 is a circuit diagram of a CDMA mobile communication system based on a CDMA detection circuit and practiced as a first embodiment of the invention.

Preferred embodiments of the invention relating to a CDMA mobile communication system will now be described in detail with reference to the accompanying drawings. In FIGS. 1 through 12, the component parts with their functionally identical or equivalent counterparts included in the prior art examples of FIGS. 13 through 18 are designated by like reference numerals.

First Embodiment

FIG. 1 is a circuit diagram showing the overall constitution of a CDMA mobile communication system practiced as the first embodiment of the invention. The base station, which transmits data usually to a plurality of mobile stations, is shown sending data to a single mobile station in FIG. 1. In the left-hand half of FIG. 1, reference numeral 1 is a base station; 51 is a modulation circuit; 91 is a spread code generator; 54 is a radio frequency quadrature modulator; 61 is a temperature compensated crystal oscillator; 58 is a circulator for separating a transmitted radio signal from a received radio signal; 12 is the first half of a detection circuit; 62 is a radio frequency quadrature demodulator; and 64 is a low-pass filter. Reference characters I and Q are an in-phase component signal and a quadrature signal respectively; $PN_{ID}$ and $PN_{QD}$ are spread code signals for the signals I and Q respectively; $S_{I1}$ and $S_{Q1}$ are an in-phase component signal and an opposite-phase component signal, respectively, subject to the spreading of the output of the detection circuit first half 12; $C_B$ is a carrier output by the oscillator 61; and 55 is an air transmission channel.

In the right-hand half of FIG. 1, reference numeral 2 is a mobile station; 52 is the first half of a detection circuit; 59 is a circulator for separating a received radio signal from a transmitted radio signal; 57 is a radio frequency quadrature demodulator; 56 is a low-pass filter; and 63 is a voltage-controlled oscillator. Reference characters $C_M$ stand for a carrier output by the oscillator 63, and AFC for a control signal for controlling the frequency of the oscillator 63. Reference numeral 70 denotes a frequency controller for generating the control signal AFC. Reference characters $CS_S$ and $SN_S$ stand for phase correction signals of the first step, to be described later; and $S_I$ and $S_Q$ for an in-phase component signal and an opposite-phase component signal subject to the spreading of the output of the detection circuit first half 52. Reference numeral 11 is a demodulation circuit; 25 is a spread code generator; and 66 is a radio frequency quadrature modulator. Reference characters $I_1$ and $Q_1$ represent an in-phase component signal and a quadrature component signal, respectively, of the data transmitted by the mobile station to the base station; and $PN\_{ID}$ and $PN\_{QD}$ denote spread code signals for the signals $I_1$ and $Q_1$, respectively, output by the generator 25.

Described below is the case in which the base station 1 transmits data and a pilot signal over a down link to the mobile station 2. The modulation circuit 51 is substantially the same in constitution as its conventional counterpart in FIG. 13. The data to be transmitted passes through a QPSK modulator, not shown, to become signals I and Q. The signals I and Q are spread by use of the spread code signals $PN\_{ID}$ and $PN\_{QD}$. The spread signals are turned by the radio frequency quadrature modulator 54 into mutually perpendicular radio frequency band signals that are transmitted from an antenna past the circulator 58. The temperature compensated crystal oscillator 61 supplies the modulator 54 with the carrier $C_B$.

Although not shown, An in-phase signal $I_P$ and a quadrature signal $Q_P$ of the pilot signals are spread respectively by spread code signals $PN\_{IP}$ and $PN\_{QP}$. Both spread code signals have the same chip rate as in the case of data. The pilot signals thus spread are subject to radio frequency quadrature modulation by the same carrier $C_B$ as with data. Following the modulation, the signals turn into mutually perpendicular signals transmitted on the same radio frequency band as with data.

Figure 2:
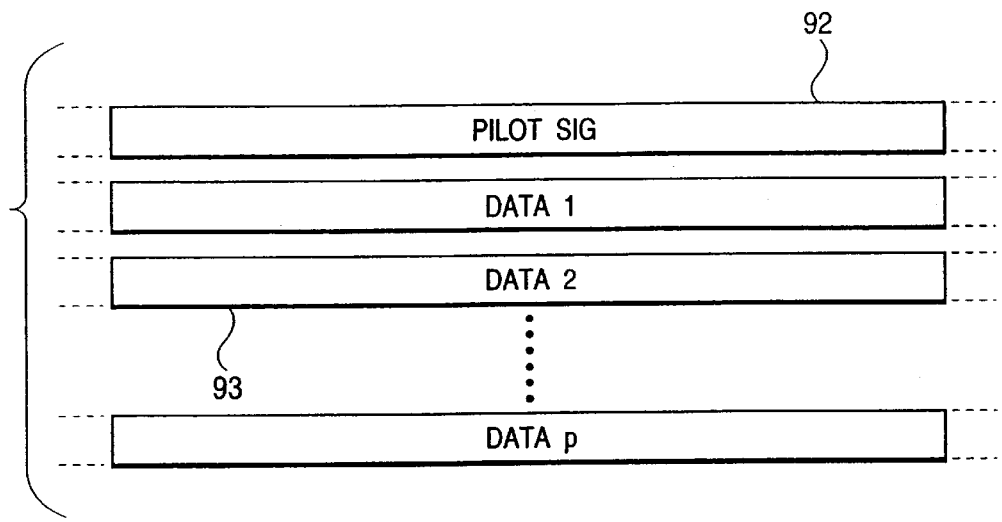
FIG. 2 is a schematic view showing a pilot signal as it is related to data in a signal transmitted by the base station of the first embodiment.

FIG. 2 schematically shows a radio frequency band signal transmitted by the base station 1. In FIG. 2, reference numeral 92 is a radio frequency band signal representing the pilot signal, and 93 is a radio frequency band signal that carries data. Data 2 in the signal 93 is destined to the mobile station 52; data 1 and p are directed to other mobile stations. The data signals 1 and p are each spread by a different spread code signal.

The data and pilot signals are thus transmitted on the same radio frequency band and received by the mobile station 2 (right-hand half of FIG. 1). The received signals are fed to the radio frequency quadrature demodulator 57 past the circulator 59. The output of the demodulator 57, from which the low-pass filter 56 removes the spurious part, becomes the signals $S_I$ and $S_Q$. The voltage-controlled oscillator 63 supplies the demodulator 57 with the carrier $C_M$.

Figure 3:
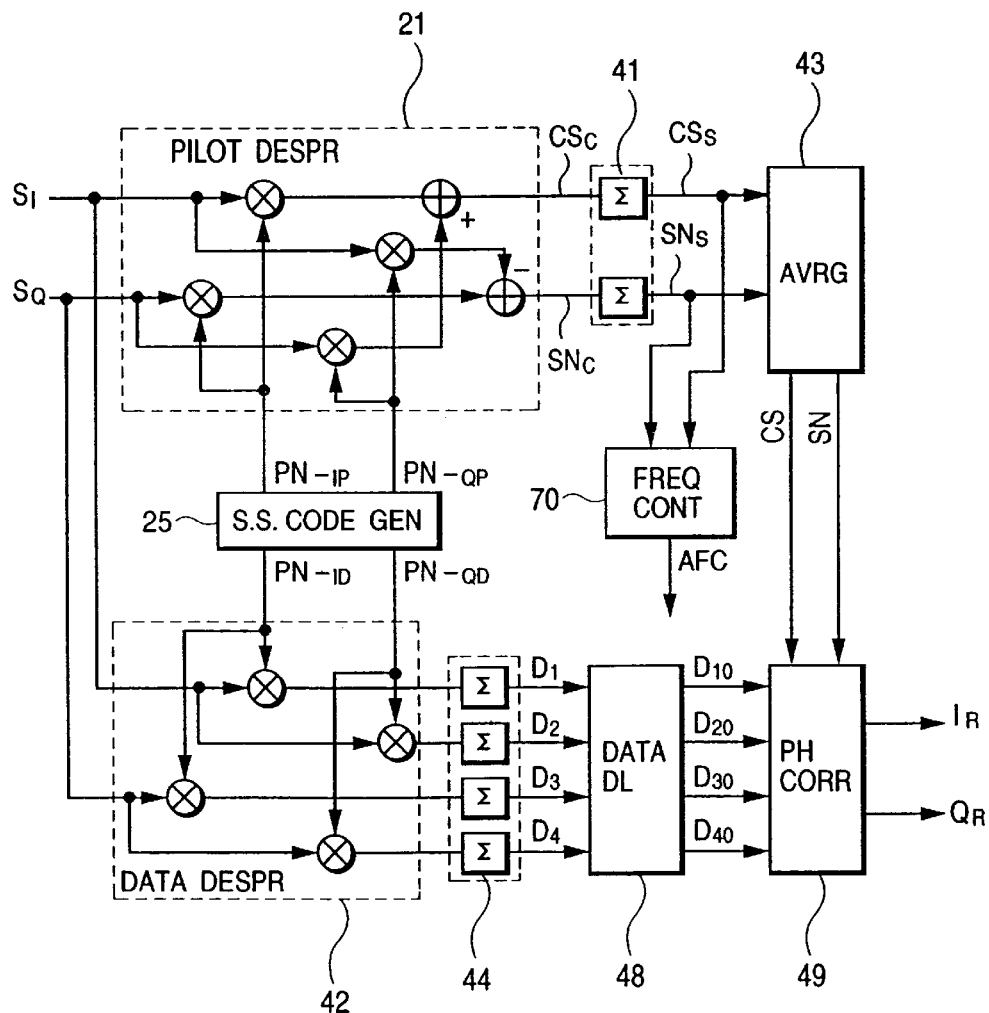
FIG. 3 is a circuit diagram of the second half of the detection circuit in a mobile station of the first embodiment.

The signals $S_I$ and $S_Q$ are despread and phase-corrected by the second half of the detection circuit. This yields restored signals $I_R$ and $Q_R$ originating from the initial signals I and Q. FIG. 3 is a circuit diagram of the second half of the detection circuit in the mobile station. The output terminals of the accumulator 41 are connected to the input terminals of the frequency controller 70 which is fed thereby with the phase correction signals $CS_S$ and $SN_S$ of the first step. Except for these connections, the setup of FIG. 3 is the same as that of the conventional circuit in FIG. 15. The component parts having their functionally identical or equivalent counterparts included in the prior art examples will not be described further.

The oscillator 63 (in the right-hand half of FIG. 1) is a known circuit using a variable capacitance diode (not shown) as the element to determine the oscillation frequency. The diode has its capacitance changed when fed with the control signal AFC, whereby the oscillation frequency is controlled.

Figure 4:
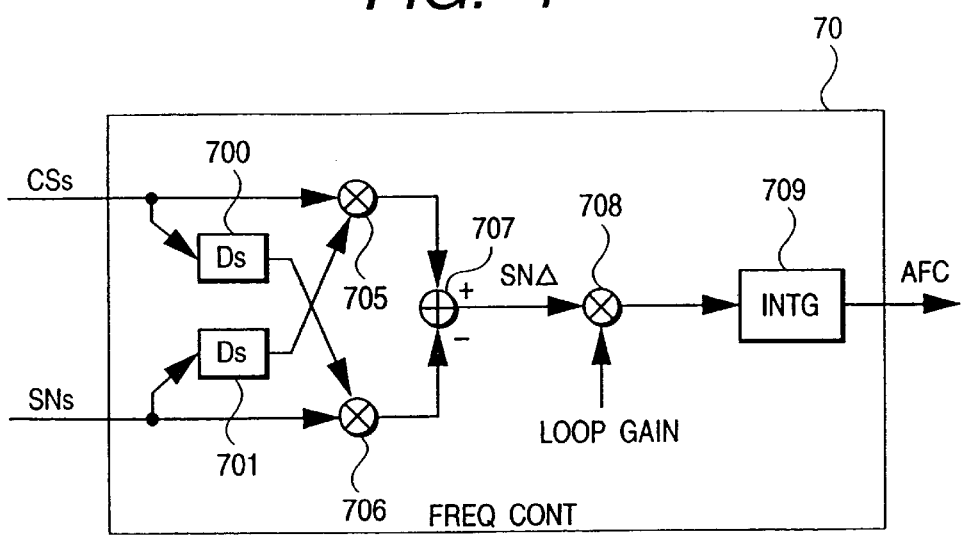
FIG. 4 is a circuit diagram of a frequency controller used by the first embodiment.

The frequency controller 70 that outputs the control signal AFC works as follows: a phase shift of $\Delta\phi$ is detected as a phase change of about one-symbol period stemming from the frequency error of the oscillator 63. The sine component ($\sin \Delta\phi$) of the phase shift is fed to an integrator so that the latter will output the control signal AFC. FIG. 4 shows the circuit constitution of the frequency controller 70. In FIG. 4, reference numerals 700 and 701 are delay gates (Ds) having a delay time of one-symbol period each, 705 and 706 are multipliers, 707 is a subtracter, 708 is a multiplier, and 709 is an integrator.

The signals $CS_S$ and $SN_S$ are delayed by the delay gates 700 and 701. The multiplier 706 multiplies the signal $SN_S$ by a signal succeeding the signal $CS_S$ by one symbol. The multiplier 705 multiplies the signal $CS_S$ by a signal succeeding the signal $SN_S$ by one symbol. The subtracter 707 subtracts the product of the multiplier 706 from that of the multiplier 705, yielding an error signal SNA having a value of $\sin \Delta\phi$. If $\Delta\phi < \pi$, then $\sin \Delta\phi$ is approximately equal to $\Delta\phi$. The error signal SNΔ having the value of $\sin \Delta\phi$ is multiplied by the multiplier 708 to provide a predetermined loop gain. The multiplied result is integrated by the integrator 709 that produces the control signal AFC.

The controller 70, oscillator 63 and radio frequency quadrature demodulator 57 in FIG. 1 as well as the despreading unit 21 and accumulator 41 in FIG. 3 constitute a control loop in which the integrator 709 integrates the signal SNΔ so that the latter will approach zero. This arrangement inhibits the frequency error and keeps the frequency of the oscillator in the mobile station as accurate as that of the oscillator in the base station.

The phase change $\Delta\phi$ is also caused by the phase error attributable to fading. However, the fading-triggered phase change is generally very slow and thus quite small compared with the change caused by frequency error. For a period of one symbol or thereabout, there is practically no harm in assuming that the change $\Delta\phi$ is caused solely by frequency error.

Figure 16:
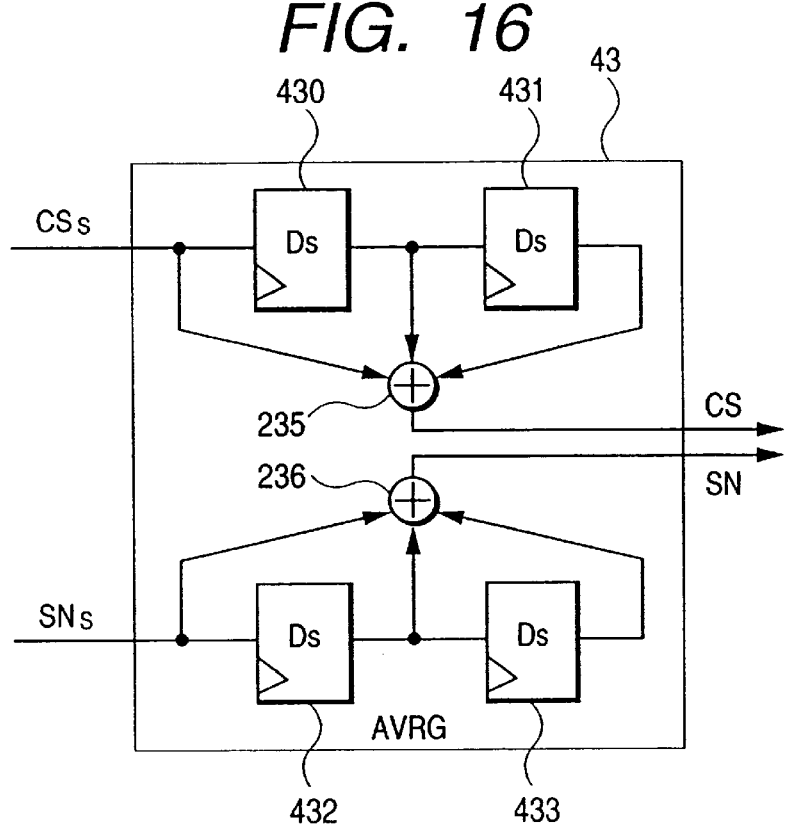
FIG. 16 is a circuit diagram of an averaging circuit in the second half of the detection circuit.
Figure 17:
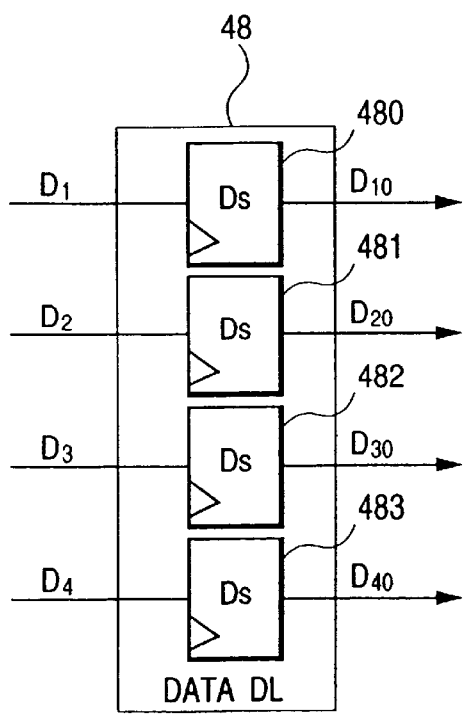
FIG. 17 is a circuit diagram of a data delaying unit in the second half of the detection circuit.
Figure 18:
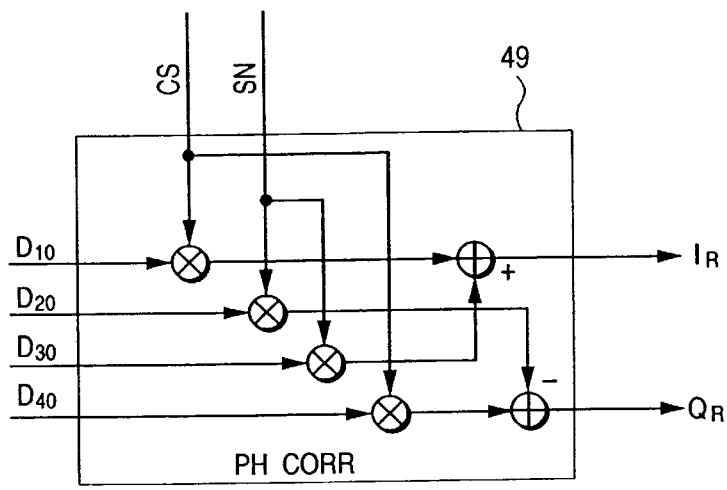
FIG. 18 is a circuit diagram of a phase correction circuit in the second half of the detection circuit.
Figure 19:
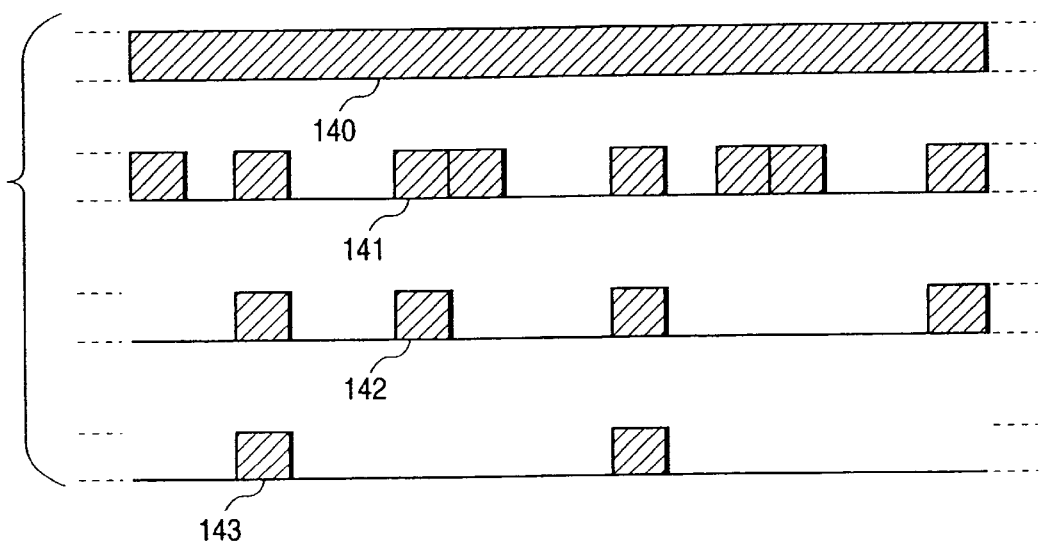
FIG. 19 is a schematic view depicting data transmission by the conventional mobile station.

The example explained above is one in which the processing of the controller 70 is carried out in a one-symbol period. If the frequency error is very small during the one-symbol period, it is possible to perform the processing of the controller 70 over a period involving a plurality of consecutive symbols. In this case, the period must not exceed the average delay time T for the averaging circuit 43 (FIG. 16).

Figure 5:
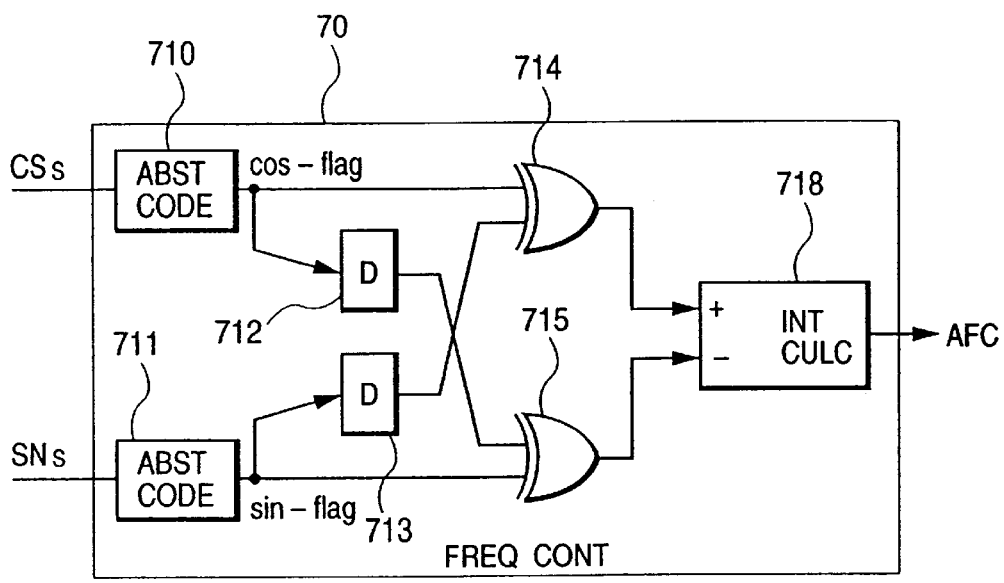
FIG. 5 is a circuit diagram of another frequency controller for use by the first embodiment.
Figure 14:
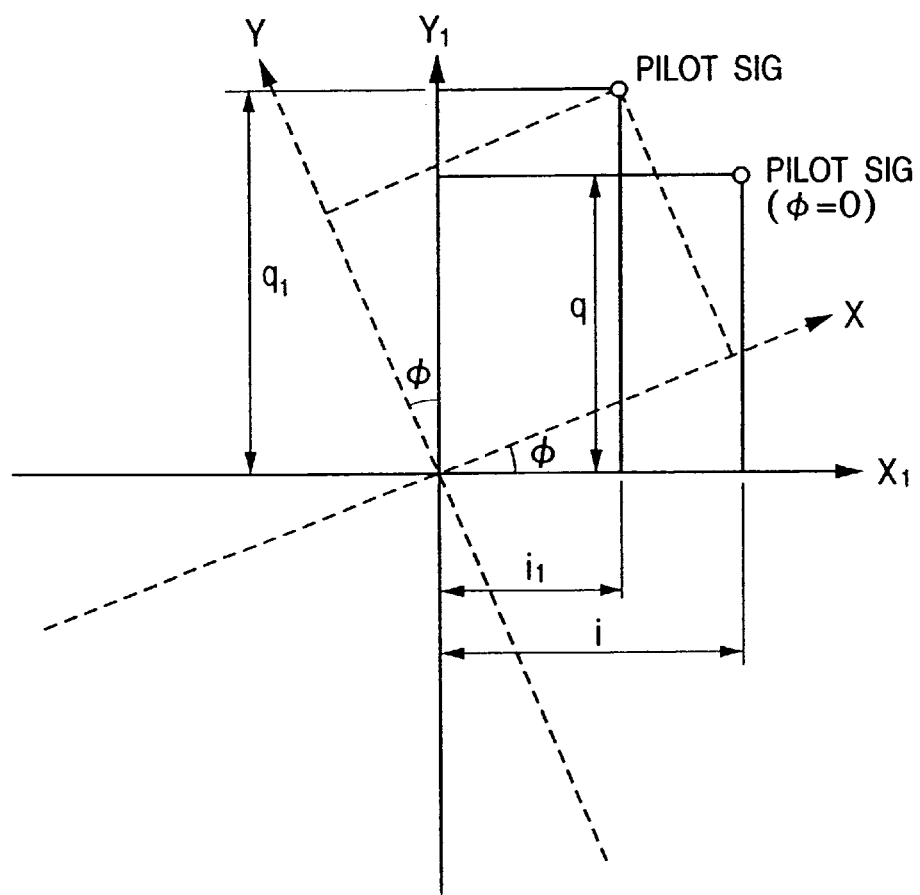
FIG. 14 is a schematic view of a receiving point as it is rotated in phase.
Figure 15:
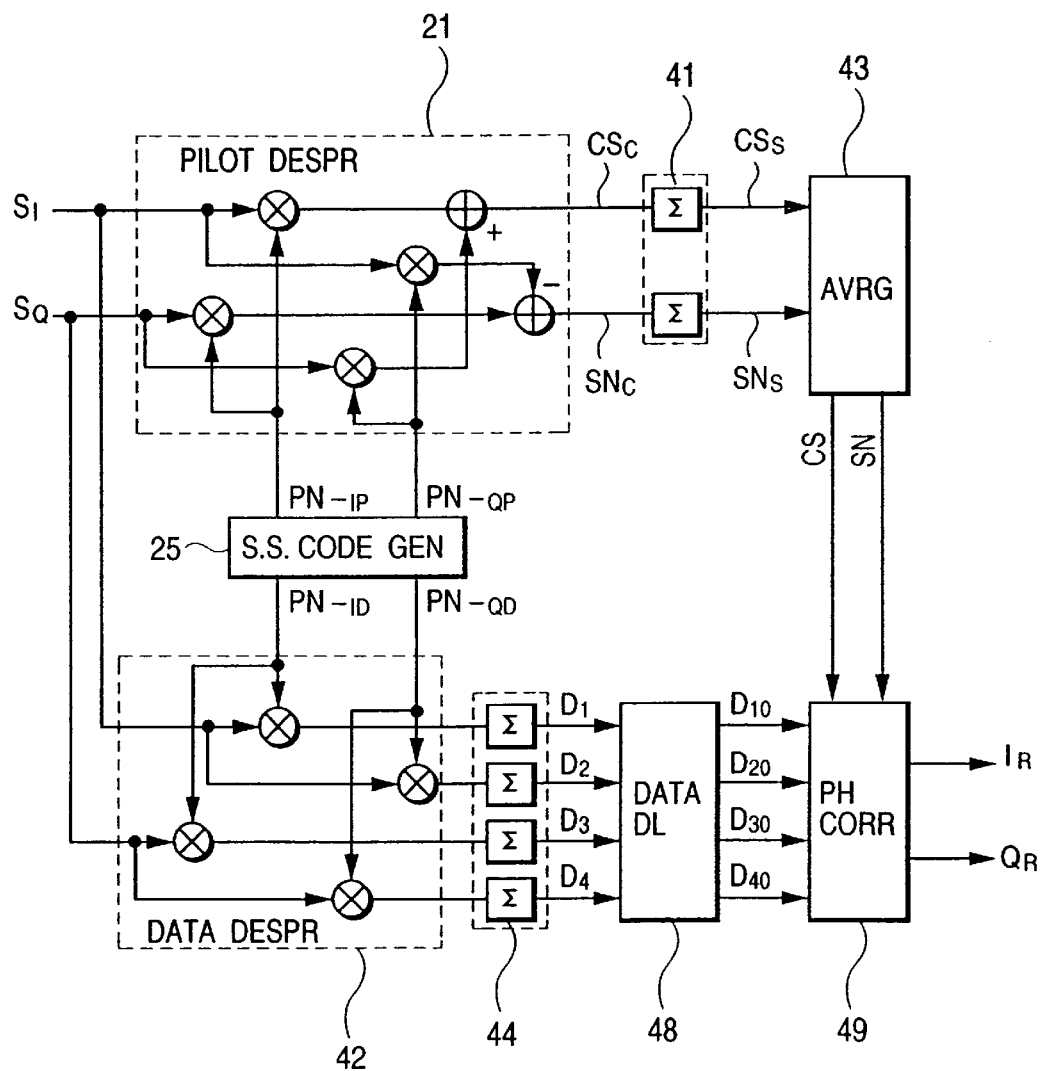
FIG. 15 is a circuit diagram of the second half of the detection circuit in the conventional mobile station.

Conversely, if the frequency error is relatively large during the one-symbol period, the processing needs to be carried out at a speed higher than the symbol rate. FIG. 5 shows a circuit diagram of an alternative frequency controller 70 performing its processing more quickly than the symbol rate. In FIG. 5, reference numerals 710 and 711 are abstract code circuits, 712 and 713 are delay gates with their delay time shorter than the one-symbol period, 714 and 715 are exclusive-OR gates, and 718 is an integral calculus. The abstract code circuits 710 and 711 extract the signs (plus or minus) from the signals $CS_S$ and $SN_S$ respectively. The extracted signs indicate a quadratic movement of the pilot signal coordinates caused by the phase shift $\phi$, as shown in FIG. 14. For example, if the phase shift $\phi$ falls within a range of 180 through 270 degrees, the receiving point moves into the third quadrant, and the signals $CS_S$ and $SN_S$ have the minus signs. The abstract code circuits 710 and 711 recognize the absence of frequency error (flag "0") if the signals have the plus signs, or the presence of frequency error (flag "1") if the signals have the minus signs. The flags "0" and "1" are output as sign signals "cos-flag" and "sin-flag" respectively.

The sign signal "cos-flag" and the sign signal "sin-flag" that has passed the delay gate 713 are fed to the gate 714. The sign signal "sin-flag" and the sign signal "cos-flag" that has passed the delay gate 712 are supplied to the gate 715. The output signals of the gates 714 and 715 are sent to the integral calculus 718. If the gate 714 outputs "1", then the integrator 718 outputs as the control signal AFC a voltage that raises the frequency of the oscillator 63; if the gate 715 outputs "1", the integrator 718 outputs as the control signal AFC a voltage that lowers the reference frequency. Where the processing needs to be performed faster than the symbol rate, as in this example, it is possible to implement a high-speed frequency controller that dispenses with multipliers carrying out time-consuming multiplications.

The voltage-controlled oscillator 63 and the two kinds of frequency controller 70 may each be constituted by a known semiconductor integrated circuit. Thus constituted, the inventive setup is incorporated advantageously in mobile stations for use by general users.

Returning to FIG. 1, what follows is a description of the case in which the mobile station 2 transmits data and pilot signals over an up link to the base station 1. The data to be transmitted undergoes QPSK modulation (not shown) to become signals $I_1$ and $Q_1$ (bottom right in FIG. 1). The signals $I_1$ and $Q_1$ are spread by the spread code signals $PN_{\_ID}$ and $PN_{\_QD}$ from the spread code generator 25. The signals thus spread pass through the radio frequency quadrature modulator 66 to become mutually perpendicular radio frequency band signals that are transmitted from an antenna past the circulator 59. The voltage-controlled oscillator 61 supplies the modulator 66 with the carrier $C_M$.

Figure 6:
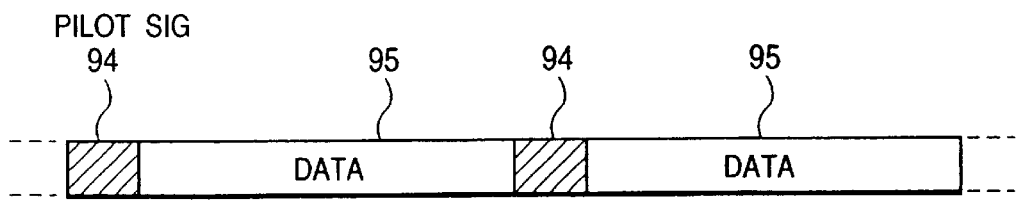
FIG. 6 is a schematic view depicting a pilot signal as it is related to data in a signal transmitted by the mobile station of the first embodiment.

In transmitting the pilot signal to the base station 1, the mobile station 2 multiplexes the signal with the data on a time-division basis. According to this method, the signals $I_1$ and $Q_1$ make up a signal form having the data and pilot signals multiplexed therein. The data and pilot signals are both spread by the spread code signals $PN_{\_ID}$ and $PN_{\_QD}$. FIG. 6 shows a radio frequency band signal multiplexed in the manner described. In FIG. 6, reference numeral 94 is a pilot signal part, and 95 is a data part.

The signal received by the antenna of the base station 1 is sent to the radio frequency quadrature demodulator 62 past the circulator 58 in the first half 51 of the detection circuit (bottom left in FIG. 1). The output signal of the demodulator 62, from which the low-pass filter 64 removes the spurious part, turns into signals $S_{I1}$ and $S_{Q1}$. The demodulator 62 is supplied with the carrier $C_B$ from the oscillator 61. The signals $S_{I1}$ and $S_{Q1}$ are subject to despreading and phase correction in the second half of the detection circuit, to be described later. The despreading and phase correction processes provide the reconstructed signals $I_{1R}$ and $Q_{1R}$ originating from the initial signals $I_1$ and $Q_1$.

Figure 7:
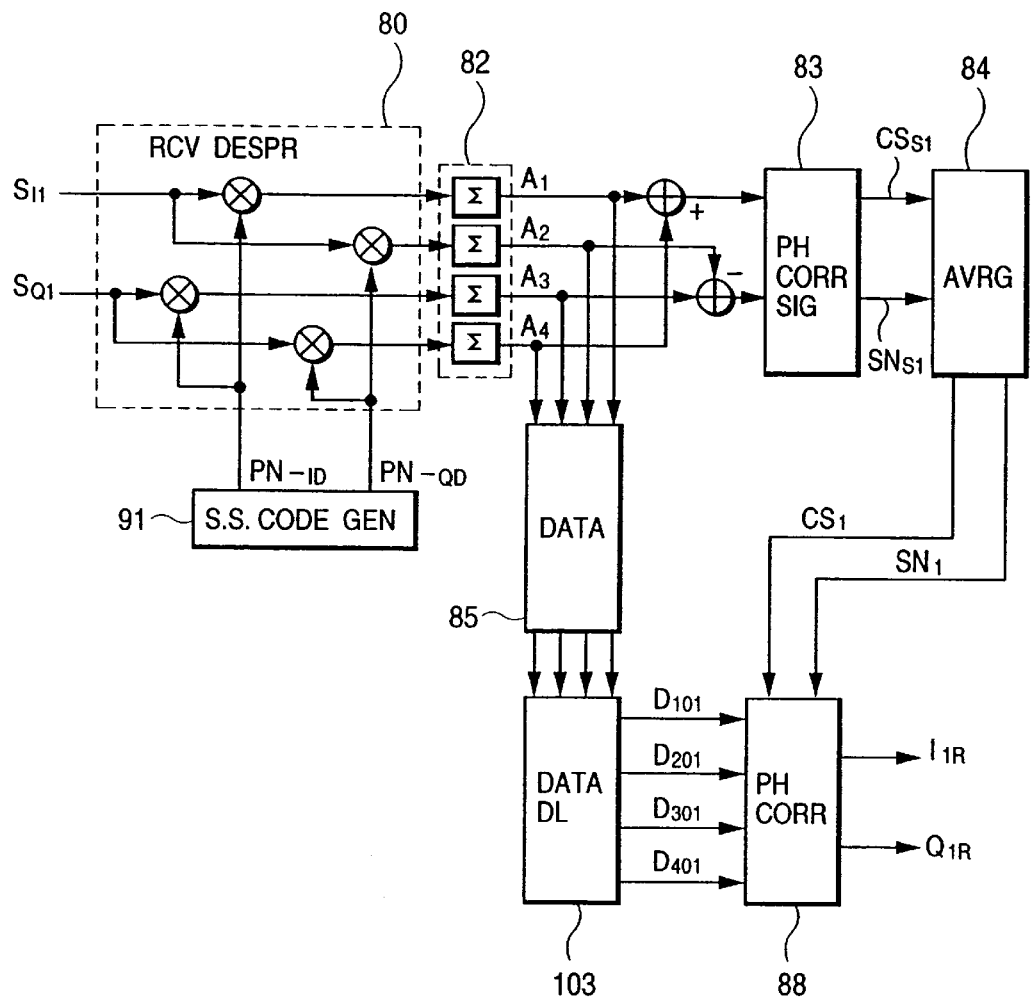
FIG. 7 is a circuit diagram of the second half of the detection circuit in the base station of the first embodiment.

FIG. 7 is a circuit diagram of the second half of the detection circuit in the base station 1. In FIG. 7, reference numeral 80 is a received signal despreading unit; 91 is a spread code generator; 82 is an accumulator; 83 is a phase correction signal extracting unit that extracts phase correction signals $CS_{S1}$ and $SN_{S1}$ of the first step; 84 is an averaging circuit that receives the signals $CS_{S1}$ and $SN_{S1}$ from the extracting unit 83 and outputs phase correction signals $CS_1$ and $SN_1$; 85 is a data extracting unit that extracts the data part from the signal converted to the symbol rate; 103 is a data delaying unit that delays the extracted data by the average delay time of the averaging circuit 84; and 88 is a phase correction circuit that rotates in phase the data from the delaying unit 103 and outputs the signals $I_{1R}$ and $Q_{1R}$.

The received signal despreading unit 80 despreads each of the received signals $S_{I1}$ and $S_{Q1}$ using the two spread code signals $PN_{\_ID}$ and $PN_{\_QD}$ from the spread code generator 91. The four chip rate signals thus obtained are converted by the accumulator 82 into symbol rate signals $A_1$ through $A_4$. The phase correction signal extracting unit 83 is supplied with the sum of the signals $A_1$ and $A_4$ (including the cosine component of the pilot signal) on the one hand, and with the difference between the signals $A_3$ and $A_2$ (including the sine component of the pilot signal) on the other. The extracting unit 83 extracts only the pilot signal part from the time-division multiplexed signals so as to output the phase correction signals $CS_{S1}$ and $SN_{S1}$ of the first step. The averaging circuit 84 averages a plurality of symbols of the signals $CS_{S1}$ and $SN_{S1}$ to output the phase correction signals $CS_1$ and $SN_1$ for use in data phase rotation.

The signals $A_1$ through $A_4$ are also sent to the data extracting unit 85. The extracting unit 85 extracts only the data part from the time-division multiplexed signals. The four-signal data thus obtained is forwarded to the data delaying unit 103. The delaying unit 103 delays each of the received four signals and outputs data $D_{101}$ through $D_{401}$. The circuit constitution of the phase correction circuit 88 is the same as that shown in FIG. 17.

Figure 8:
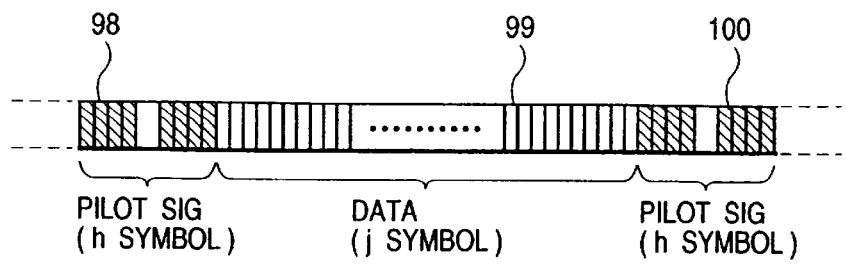
FIG. 8 is a schematic view illustrating pilot signals as they are related to data in a signal transmitted by the mobile station of the first embodiment.

With the first embodiment, the values of phase rotation by the correction signals $CS_1$ and $SN_1$ are set as indicated below. FIG. 8 shows the received signal structured in units of symbols. In FIG. 8, a pilot signal of h symbols and a data signal of j symbols are alternately received. Initially, the averaging circuit 84 averages the h symbols of a pilot signal 98 and the h symbols of a pilot signal 100. The averaging operation determines phase rotation quantities of φh1 and φh2. The amount of phase rotation per symbol of data 99 is given as $$\phi h1(1-s/h)+\phi h2(s/h)$$

where s stands for the s-th symbol (s=1–j). In this manner, the phase rotation is accomplished while the pilot signals preceding and succeeding the data part are taken into consideration. This requires delaying the current data until the ensuing pilot signal is received. Thus the average delay time, i.e., the delay time of the delaying unit 103, is determined as the j-symbol period of the data 99 supplemented by the h-symbol period of the pilot signal 100.

Where the up link described above is in effect, the radio frequency quadrature modulator 66 (bottom right in FIG. 1) of the mobile station 2 is supplied with the carrier $C_M$ output and kept precise by the voltage-controlled oscillator 63. This allows the base station 1 to avoid the problem of frequency error and to implement stable detection. That in turn makes it possible to adopt a spreading circuit that keeps the chip rate of the spread code constant where the mobile station transmits data at a bit rate lower than the standard rate. If k is assumed to represent the spreading ratio in effect when the data bit rate is standard, the spreading ratio is changed to bk where the bit rate is 1/b (b≧1) of the standard bit rate.

Figure 9:
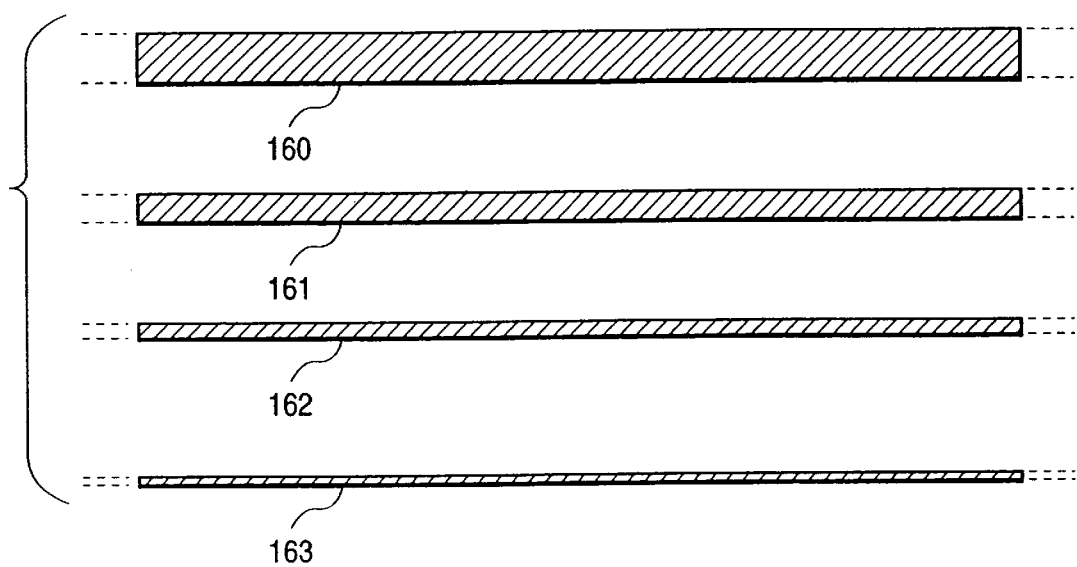
FIG. 9 is a schematic view explaining data transmission by the mobile station of the first embodiment.

FIG. 9 shows transmitted signals of different bit rates. In FIG. 9, the axis of abscissa represents time and the axis of ordinate denotes transmission power. Reference numeral 160 is a signal that transmits data at the standard bit rate with a spreading ratio of k; 161 is a signal that transmits data at ½ of the standard bit rate with a spreading ratio of 2 k, powered by ½ of the power level for the standard bit rate;

162 is a signal that transmits data at ¼ of the standard bit rate with a spreading ratio of 4 k, powered by ¼ of the standard power level; and 163 is a signal that transmits data at ⅛ of the standard bit rate with a spreading ratio of 8 k, powered by ⅛ of the standard power level. In transmitting data at such different bit rates, the first embodiment implements CDMA communication by varying the circuit constant in keeping with the bit rate but without changes in the circuit constitution.

Second Embodiment

Described below is the second embodiment of the inventive CDMA mobile communication system in which a plurality of mobile stations are assigned different spread codes for their pilot signals, each mobile station transmitting the pilot signal using the assigned spread code over an up link to the base station. Data is transmitted by use of the modulation circuit 11 shown in the right-hand half of FIG. 1. Although not shown, an in-phase signal and a quadrature signal of the pilot signals are spread respectively by spread code signals having the same chip rate as in the case of data. The pilot signals thus spread are subject to radio frequency quadrature modulation by the same carrier $C_B$ as with data. Having undergone the modulation, the signals turn into mutually perpendicular signals transmitted on the same radio frequency band as with data.

Figure 10:
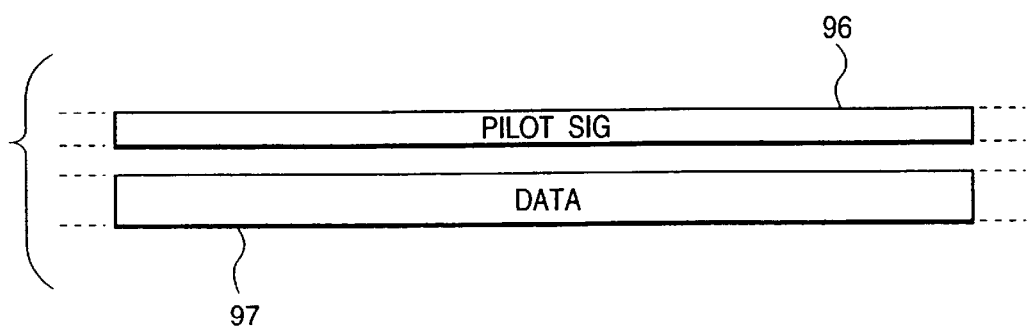
FIG. 10 is a schematic view showing a pilot signal as it is related to data in a signal transmitted by a mobile station of a second embodiment.

FIG. 10 schematically shows radio frequency band signals transmitted by the mobile station 2. In FIG. 10, reference numeral 96 is a radio frequency band pilot signal, and 97 is a radio frequency band data signal. The pilot signal is transmitted at a power level lower than the data signal. The transmitted signals are received by the base station 1 constituted by the first half of the detection circuit 12 in the bottom left portion of FIG. 1 and by a circuit having the same construction as the second half of the detection circuit in FIG. 3.

The modulation circuit 11 in the mobile station 2 utilizes the carrier $C_M$ kept precise for radio frequency quadrature modulation. This allows the base station 1 to circumvent the problem of frequency error and to implement stable detection.

Third Embodiment

Figure 11:
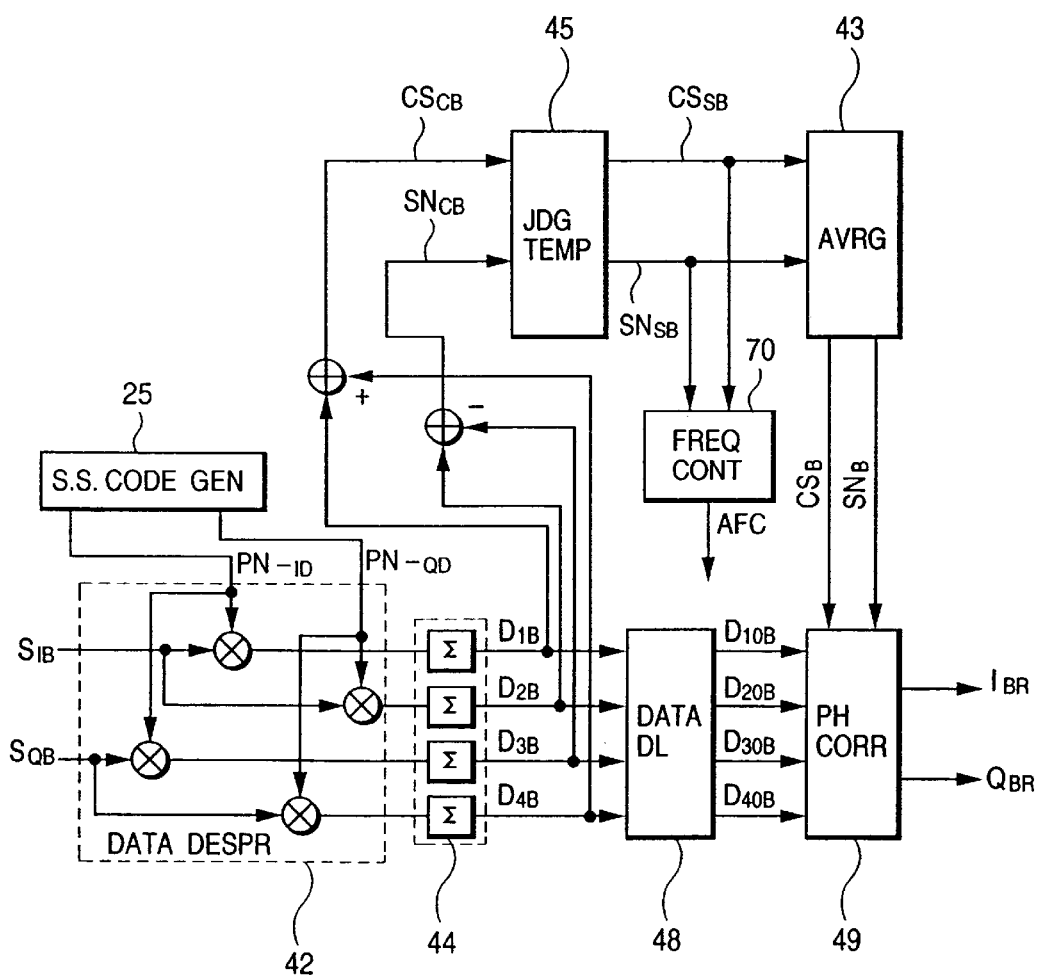
FIG. 11 is a circuit diagram of the second half of the detection circuit in the base station of a third embodiment.

Described below is the third embodiment of the inventive CDMA mobile communication system which derives the phase correction signals of the first step from the phase rotation changes of data, with no use of pilot signals for frequency control. With the third embodiment, the data to be transmitted from the base station 1 is subject to BPSK (binary phase shift keying) modulation. Signals $I_B$ and $Q_B$ are acquired through the BPSK modulation. The modulation circuit of the base station 1 and the first half of the detection circuit in the mobile station 2 in connection with the signals $I_B$ and $Q_B$ are the same as those shown in FIG. 1. The second half of the detection circuit in the mobile station 2 is illustrated in FIG. 11. In FIG. 11, reference numeral 45 represents a temporary judge circuit. Reference characters $CS_{C_B}$ and $SN_{C_B}$ denote input signals to the temporary judge circuit 45, and $CS_{S\,B}$ and $SN_{S\,B}$ indicate phase correction signals of the first step output by the temporary judge circuit 45.

The data despreading unit 42, spread code generator 25, accumulator 44, averaging circuit 43, data delaying unit 48, phase correction circuit 49 and frequency controller 70 in FIG. 11 are the same in function as their counterparts of the first embodiment in FIGS. 3 and 4. The signals $CS_{S\,B}$ and $SN_{S\,B}$ are supplied to the frequency controller 70 generating the control signal AFC for the voltage-controlled oscillator 63 (FIG. 1). The signals $CS_{S\,B}$ and $SN_{S\,B}$ are also fed to the averaging circuit 43 that generates phase correction signal $CS_B$ and $SN_B$.

In the second half of the detection circuit in the mobile station 2 of FIG. 11, the signals $S_{I\,B}$ and $S_{Q\,B}$ output by the detection circuit first half 52 (right-hand half in FIG. 1) are despread by the data despreading unit 42 using the spread code signals $PN_{-ID}$ and $PN_{-QD}$ for the signals $I_B$ and $Q_B$ respectively. The despread signals are converted by the accumulator 44 from the chip rates to symbol rate signals $D_{1\,B}$ through $D_{4\,B}$. The signals $D_{1\,B}$ and $D_{4\,B}$ are added up to yield the signal $CS_{C\,B}$ representing the cosine component of the data, and the signal $D_{2\,B}$ is subtracted from the signal $D_{3\,B}$ to give the signal $SN_{C\,B}$ representing the sine component of the data. The signals $CS_{C\,B}$ and $SN_{C\,B}$ are fed to the temporary judge circuit 45.

The data is composed of "1" and "0" iterations or of no changes per symbol (the pilot signal remains unchanged). Thus where the signals $CS_{C\,B}$ and $SN_{C\,B}$ are both inverted in phase per symbol due to data changes, it is desired to generate signals that would correct the phase inversion so as to render the input signals apparently unchanged with no shift in phase. Such signals, when generated by the temporary judge circuit 45, serve as phase correction signals of the first step functionally equivalent to those acquired by use of the pilot signal.

Figure 12:
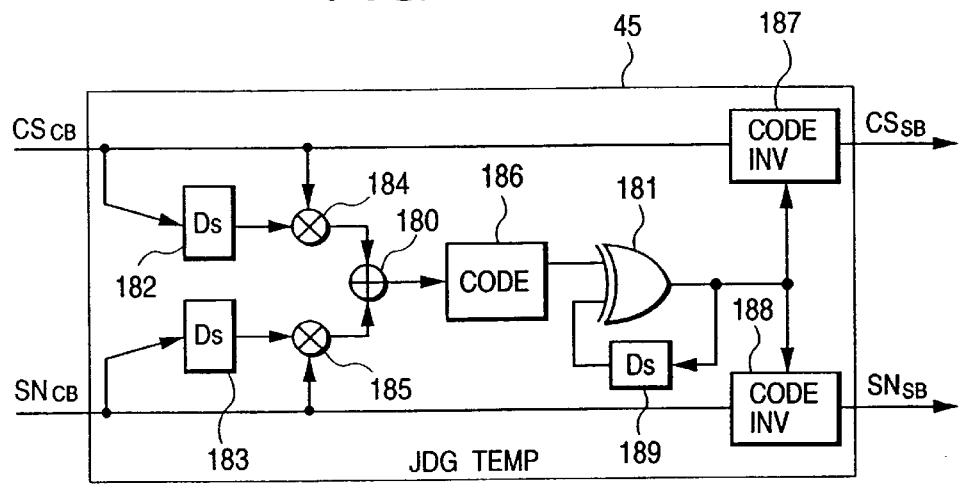
FIG. 12 is a circuit diagram of a temporary judge circuit in the second half of the detection circuit shown in FIG. 11.
Figure 13:
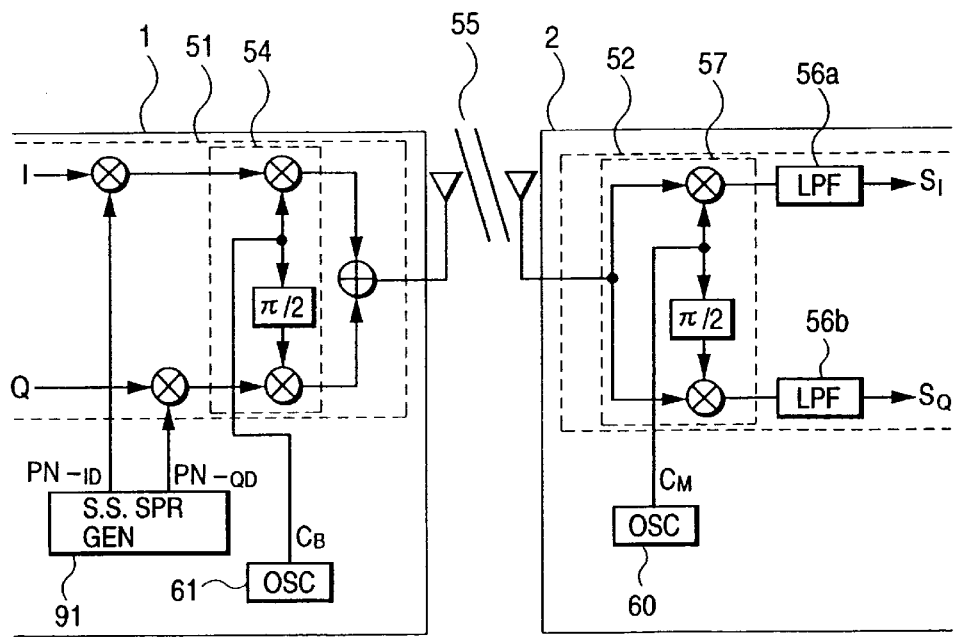
FIG. 13 is a circuit diagram of the modulation circuit in a conventional base station and the first half of the detection circuit in a conventional mobile station.

FIG. 12 is a circuit diagram of the temporary judge circuit 45. In FIG. 12, reference numerals 182, 183 and 189 are delay gates (Ds) having a delay time of one-symbol period each; 184 and 185 are multipliers; 180 is an adder; 186 is a abstract code circuit; 181 is an exclusive-OR gate; and 187 and 188 are sign inverting units.

The signal $CS_{C\,B}$ is multiplied by a signal preceding the signal $CS_{C\,B}$ by one symbol, and the product is fed to the adder 180. At the same time, the signal $SN_{C\,B}$ is multiplied by a signal preceding the signal $SN_{C\,B}$ by one symbol, and the product is supplied to the adder 180. The result of the addition is sent to the abstract code circuit 186 which outputs a signal indicating whether the signals $CS_{C\,B}$ and $SN_{C\,B}$ are simultaneously inverted in phase.

The output signal of the extracting unit 186 is sent to the exclusive-OR gate 181. The other input of the exclusive-OR gate 181 is a signal preceding by one symbol the output signal of the same gate. The exclusive-OR gate 181 outputs "1" if the absence of the simultaneous phase inversion preceding a given symbol is replaced by the presence of the inversion following that symbol or vice versa; the exclusive-OR gate 181 outputs "0" if the simultaneous phase inversion is either absent or present both before and after a symbol (if the simultaneous phase inversion of the signals $CS_{C\,B}$ and $SN_{C\,B}$ continues before and after a symbol, that means the original data is restored). With the exclusive-OR gate 181 outputting "1", the sign inverting units 187 and 188 output the input signals $CS_{C\,B}$ and $SN_{C\,B}$ after simultaneously inverting them in phase. Where the exclusive-OR gate 181 outputs "0", the input signals $CS_{C\,B}$ and $SN_{C\,B}$ are output uninverted. The process above turns the signals $CS_{C\,B}$ and $SN_{C\,B}$ into the phase correction signals $CS_{S\,B}$ and $SN_{S\,B}$ of the first step respectively.

The constitution and the workings of the frequency controller 70 are the same as those of the first and the second embodiments. Given the phase correction signals $CS_{S\,B}$ and $SN_{S\,B}$ of the first step, the frequency controller 70 outputs the control signal AFC to control the voltage-controlled oscillator 63. With the third embodiment, the phase rotation of the data following despreading is corrected and the voltage-controlled oscillator 63 is kept accurate as effectively as in the case where the pilot signal is utilized. The third embodiment thus permits the base station 1 and mobile station 2 to implement stable detection. In particular, the mobile station 2 is allowed to realize data transmission with an appropriate spreading ratio selected.

Although the first through the third embodiments adopt QPSK or BPSK modulation upstream of the spreading process, this is not limitative of the invention. The invention is not dependent on the pre-spread modulation scheme because the invention aims to keep precise the carrier for radio frequency modulation and demodulation. Any system of pre-spreading modulation may be adopted in conjunction with the invention. The invention, when suitably embodied, promises stable operation in both coherent detection and differential detection.

According to the invention, the pilot signal acquired from despreading is used to detect frequency error, and the frequency of the carrier is controlled so as to reduce the detected frequency error to zero. This allows the mobile station to implement stable detection with a minimum of bit error. Since the same carrier is used in radio frequency quadrature modulation, the base station is allowed to realize stable detection with reduced bit error. When the mobile station is to transmit data at a low bit rate, an appropriate spreading ratio may be selected in accordance with the bit rate. This arrangement averts the process of keeping the spreading ratio constant—a process that complicates circuitry. The features above make it possible to implement a more practical CDMA mobile communication system of higher performance than ever before.

It is further understood by those skilled in the art that the foregoing description pertains to preferred embodiments of the disclosed system and that various changes and modifications may be made in the invention without departing from the spirit and scope thereof.

What is claimed is:

1. A mobile station for use with a mobile communication system multiplexing a plurality of communication channels using spread spectrum codes, comprising:

an oscillator;

a radio frequency demodulator demodulating a radio frequency band signal transmitted from a base station by use of a signal from said oscillator;

a spreading circuit spreading a data signal to be transmitted; and a radio frequency modulator modulating said spread data signal by use of a signal from said oscillator, wherein an oscillation frequency of the oscillator is controlled by use of a change of phase shift detected using a signal representing a phase shift detected from the demodulated radio frequency band signal transmitted from the base station.

2. The mobile station according to claim 1, wherein said spreading circuit spreads the data signal to be transmitted with a spreading ratio according to a bit rate of said data signal.

3. The mobile station according to claim 2, wherein a spread code for spreading the data signal has a constant chip rate.

4. The mobile station according to claim 1, further comprising:

a despreading circuit despreading the demodulated radio frequency band signal.

5. The mobile station according to claim 4, wherein said despreading circuit extracts a pilot signal by despreading the demodulated radio frequency band signal using the spread spectrum code assigned to the pilot signal, and wherein the phase shift is detected from the extracted pilot signal.

6. A method for transmitting a data signal in a mobile station for use with mobile communication system multiplexing a plurality of communication channels using spread spectrum codes, comprising the steps of:

demodulating a received radio frequency band signal transmitted from a base station by use of a signal from an oscillator;

spreading a data signal to be transmitted; and modulating said spread data signal by use of a signal from the oscillator, wherein an oscillation frequency of the oscillator is controlled by use of a change of phase shift detected using a signal representing a phase shift detected from the demodulated radio frequency band signal transmitted from the base station.

7. The method for transmitting a data signal according to claim 6, wherein the spreading circuit spreads the data signal to be transmitted with a spreading ratio according to a bit rate of said data signal.

8. The method for transmitting a data signal according to claim 7, wherein a spread code for spreading the data signal has a constant chip rate.

9. The method for transmitting a data signal according to claim 6, further comprising the step of:

despreading the demodulated radio frequency band signal.

10. The method for transmitting a data signal according to claim 6, further comprising the step of:

extracting a pilot signal by despreading the demodulated radio frequency band signal using the spread spectrum code assigned to the pilot signal, wherein the phase shift is detected from the extracted pilot signal.

11. A method for detecting a data signal by a mobile station for use with mobile communication system multiplexing a plurality of communication channels using spread spectrum codes, comprising the steps of:

demodulating a received radio frequency band signal transmitted from a base station by use of a signal from an oscillator;

detecting a phase shift from the demodulated radio frequency band signal; and controlling an oscillation frequency of the oscillator according to a change of the phase shift.

12. The method for detecting a data signal according to claim 11, further comprising the step of:

extracting a pilot signal by despreading the demodulated radio frequency band signal using the spread spectrum code assigned to the pilot signal, wherein the phase shift is detected from the extracted pilot signal.

* * * * *